(12) United States Patent
Li

(10) Patent No.: US 11,910,092 B2
(45) Date of Patent: Feb. 20, 2024

(54) PANORAMIC LOOK-AROUND VIEW GENERATION METHOD, IN-VEHICLE DEVICE AND IN-VEHICLE SYSTEM

(71) Applicant: Black Sesame International Holding Limited, Santa Clara, CA (US)

(72) Inventor: Wenxue Li, Wuhan (CN)

(73) Assignee: Black Sesame Technologies Inc., San Jose, CA (US)

( * ) Notice: Subject to any disclaimer, the term of this patent is extended or adjusted under 35 U.S.C. 154(b) by 429 days.

(21) Appl. No.: 17/061,026

(22) Filed: Oct. 1, 2020

(65) Prior Publication Data
US 2022/0109791 A1 Apr. 7, 2022

(51) Int. Cl.
*H04N 23/698* (2023.01)
*G06T 7/33* (2017.01)
(Continued)

(52) U.S. Cl.
CPC ............. *H04N 23/698* (2023.01); *B60R 1/00* (2013.01); *B60R 11/0229* (2013.01);
(Continued)

(58) Field of Classification Search
CPC ....... B60R 1/00; B60R 11/0229; B60R 11/04; B60R 1/02; B60R 2300/105;
(Continued)

(56) References Cited

U.S. PATENT DOCUMENTS 8,049,778 B2 * 11/2011 Kuboyama ........... G06T 1/0007
348/148
9,056,630 B2 * 6/2015 Han ...................... G08G 1/167
(Continued)

FOREIGN PATENT DOCUMENTS

CN 103226831 A 7/2013
CN 103886569 A 6/2014
(Continued)

*Primary Examiner* — Philip P. Dang
(74) *Attorney, Agent, or Firm* — Timothy T. Wang; Ni, Wang & Massand, PLLC

(57) ABSTRACT

The current disclosure relates to a panoramic look-around view generation method, an in-vehicle device and an in-vehicle system. The method comprises the following steps of: acquiring images of areas around a vehicle, steering wheel angle information and vehicle speed information; transforming and mosaicking the images to generate a time-related look-around view, and using an ORB algorithm to extract characteristic points; using steering wheel angle information and vehicle speed information to calculate a positron of a characteristic point of the look-around view at previous time in the look-around view at current time according to a vehicle motion model, and selecting a characteristic point located near the position in the look-around view at current time to be matched with the characteristic point of the look-around view at previous time; calculating an affine transformation matrix and performing affine transformation, and performing weighted fusion with the look-around view at current time and storing it; repeating the above steps to obtain a continuously updated panoramic look-around view. The method, the device and the system can eliminate blind area in the underbody region, realize a panoramic perspective view, and have fast calculation and high accuracy.

4 Claims, 12 Drawing Sheets

(51) Int. Cl.
*G06T 3/00* (2006.01)
*B60R 11/04* (2006.01)
*B60R 1/00* (2022.01)
*B60R 11/02* (2006.01)

(52) U.S. Cl.
CPC ............ *B60R 11/04* (2013.01); *G06T 3/0006* (2013.01); *G06T 3/4038* (2013.01); *G06T 7/337* (2017.01); *B60R 2300/105* (2013.01); *B60R 2300/302* (2013.01); *B60R 2300/303* (2013.01); *G06T 2207/30252* (2013.01)

(58) Field of Classification Search
CPC ........ B60R 2300/302; B60R 2300/303; B60R 2300/30; B60R 2300/60; B60R 2300/607; G06T 3/0006; G06T 3/4038; G06T 7/337; G06T 2207/30252; G06T 2207/10016; G06T 7/33; H04N 5/23238; H04N 5/247
See application file for complete search history.

(56) References Cited

U.S. PATENT DOCUMENTS

| | | | |
|---|---|---|---|
| 9,478,061 B2* | 10/2016 | Shimizu | G06V 20/56 |
| 9,996,976 B2* | 6/2018 | Zhou | G06T 7/344 |
| 10,078,892 B1* | 9/2018 | Wang | B60C 11/246 |
| 10,169,667 B2* | 1/2019 | Ogata | G06T 7/248 |
| 10,354,151 B2* | 7/2019 | Yoon | G06V 10/44 |
| 10,565,736 B2* | 2/2020 | Oba | G06T 7/80 |
| 10,864,855 B2* | 12/2020 | Hashimoto | G01B 11/00 |
| 10,872,433 B2* | 12/2020 | Stein | G06T 7/55 |
| 10,953,811 B2* | 3/2021 | Kim | B60R 11/0235 |
| 11,042,163 B2* | 6/2021 | Chen | G06N 20/00 |
| 11,294,376 B2* | 4/2022 | Maeda | G01C 21/3885 |
| 11,528,413 B2* | 12/2022 | Oba | B60Q 9/008 |
| 11,590,929 B2* | 2/2023 | Bhattacharya | G05B 13/027 |
| 2009/0096937 A1* | 4/2009 | Bauer | B60R 1/12 |
| | | | 348/739 |
| 2012/0249794 A1* | 10/2012 | Kiyo | B60R 1/00 |
| | | | 348/148 |
| 2017/0039765 A1* | 2/2017 | Zhou | G06T 7/521 |
| 2018/0210442 A1* | 7/2018 | Guo | G05D 1/0016 |
| 2019/0266416 A1* | 8/2019 | Hung | G06V 20/56 |
| 2019/0325595 A1* | 10/2019 | Stein | G06T 7/248 |
| 2020/0158517 A1* | 5/2020 | Tadi | G06T 7/579 |
| 2020/0282909 A1* | 9/2020 | Zimmerman | B60R 1/00 |
| 2021/0097707 A1* | 4/2021 | Oba | G01B 11/026 |
| 2022/0078390 A1* | 3/2022 | Jingu | H04N 13/117 |

FOREIGN PATENT DOCUMENTS

| | | | | |
|---|---|---|---|---|
| CN | 105551022 A | 5/2016 | | |
| CN | 108257092 A | 7/2018 | | |
| CN | 110084248 A | 8/2019 | | |
| EP | 3940633 A1 * | 1/2022 | ............ | G06T 7/337 |
| WO | 2015056826 A1 | 4/2015 | | |

* cited by examiner

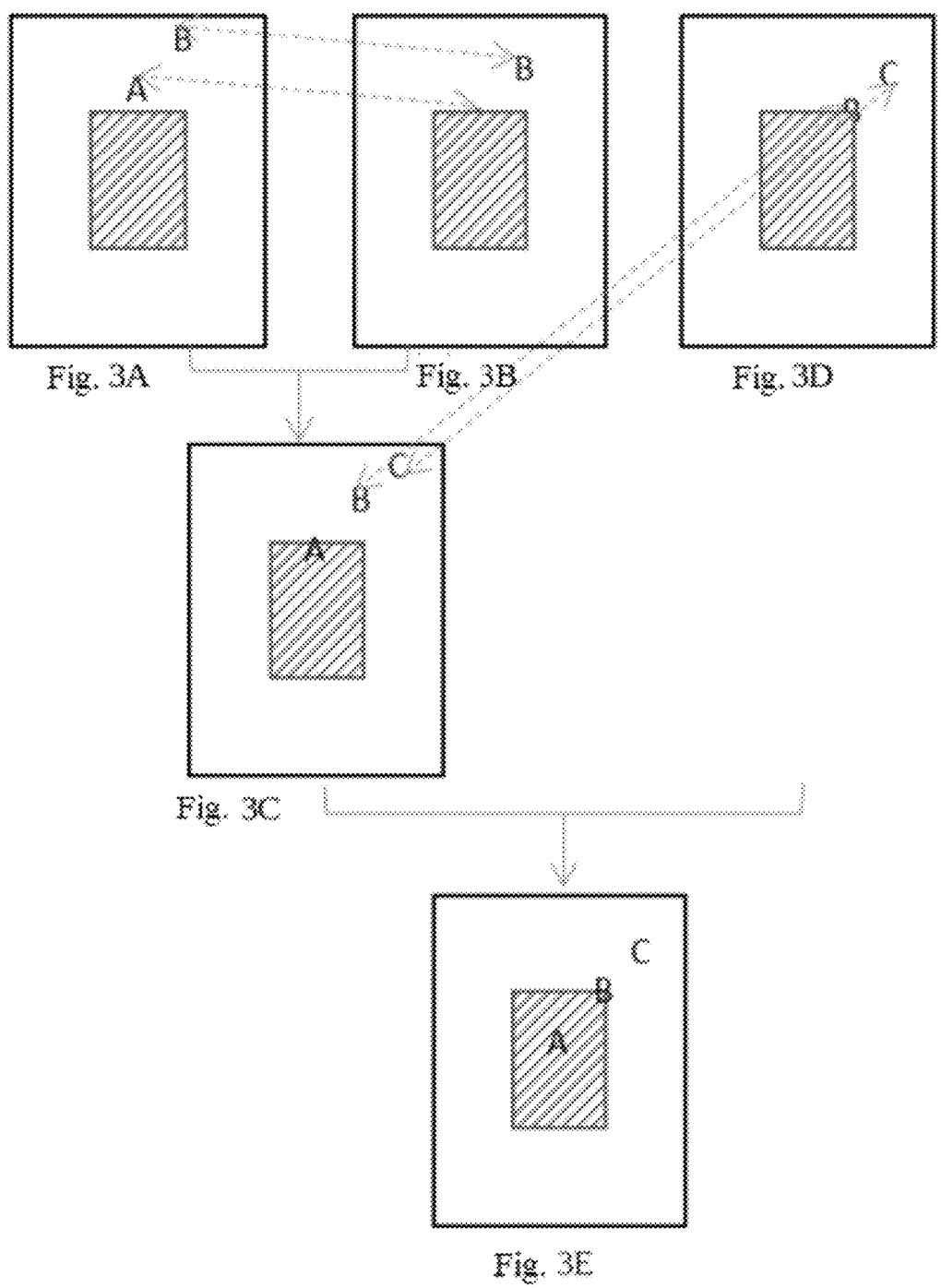

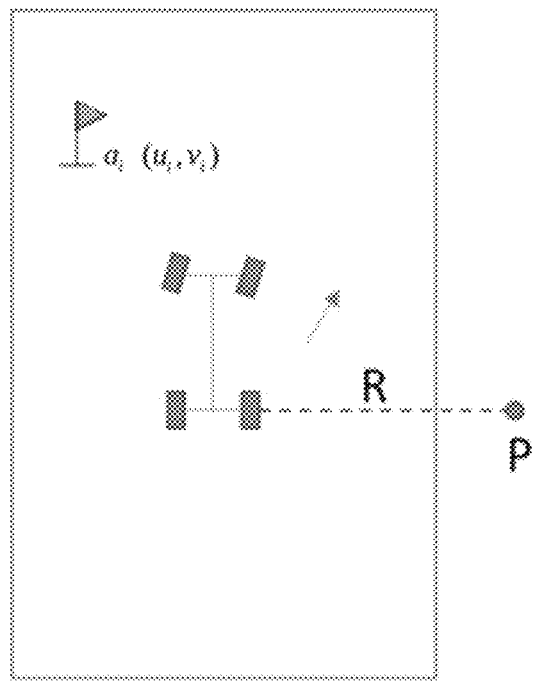
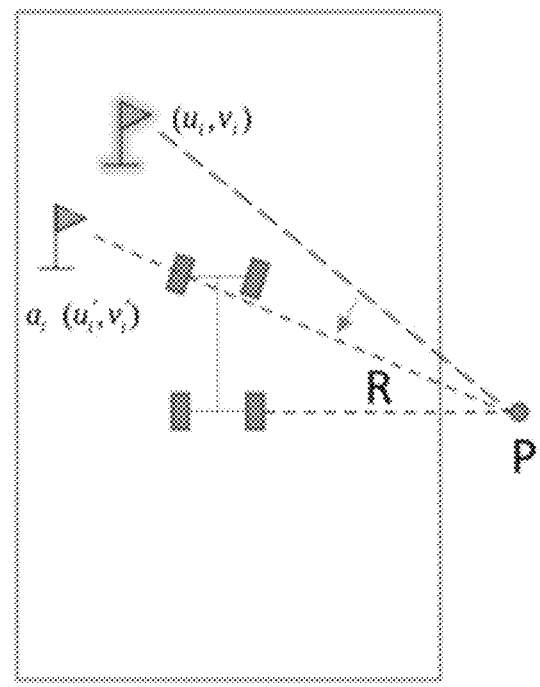
Fig. 4A  Fig. 4B
Steering wheel angle information and vehicle speed information are used to obtain a first transformation matrix of the image coordinate systems from the previous time to the current time according to the vehicle motion model. — S501
Fig. 5

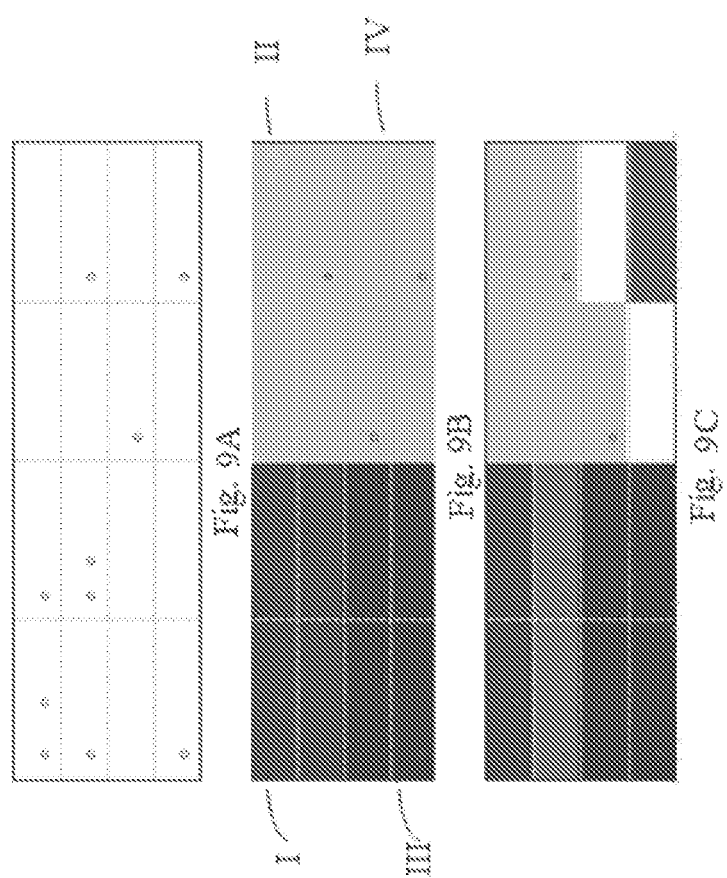

Distortion correction and perspective transformation are performed on the images acquired from the plurality of cameras according to the calibrated internal parameter and external parameter information of the plurality of cameras. —S200

(Added)

PANORAMIC LOOK-AROUND VIEW GENERATION METHOD, IN-VEHICLE DEVICE AND IN-VEHICLE SYSTEM

BACKGROUND

(1) Technical Field

The current disclosure relates to the field of machine vision, in particular to a panoramic look-around view generation method, an in-vehicle device and an in-vehicle system.

(2) Background

With rapid development of image and computer vision technology, more and more vehicles begin to install panoramic look-around systems. Existing panoramic look-around systems generally include imaging devices and image processing units. The imaging device includes a plurality of cameras capable of covering all view field range around the vehicle, for example, fisheye cameras with wide view field range respectively installed at the front and rear of the vehicle, and at the left and right rearview mirrors, etc. These cameras image the surrounding environment of the vehicle and transmit the acquired images to the image processing unit. The image processing unit associates the received image with time, and processes the images from multiple cameras at the same time, for example, performs transformation and mosaic on images to obtain a panoramic look-around view, i.e., a 360-degree top view of the vehicle body around the vehicle.

However, such a panoramic look-around system cannot capture the image of the underbody region, which results in that the underbody region cannot be displayed in the panoramic look-around view, forming a blind area for displaying the underbody region, affecting the analysis of the road conditions in the underbody region and the position judgment during driving by drivers and passengers of the vehicle.

SUMMARY OF THE INVENTION

Based on this, as to the problem that the underbody region cannot be displayed in the panoramic look-around view generated in the prior art, it is necessary to provide a panoramic look-around view generation method, an in-vehicle device, and an in-vehicle system that can realize a vehicle see-through view and thus display the underbody region.

A panoramic look-around view generation method comprises the following steps:
  acquiring images of areas around a vehicle from a plurality of cameras installed on the vehicle, and acquiring steering wheel angle information and vehicle speed information from the vehicle;
  generating a look-around view associated with time by transforming and mosaicking images acquired from the plurality of cameras, using the look-around view generated at current time as the look-around view at current time, and saving the look-around view at current time;
  performing registration calculation on the look-around view at current time and the saved look-around view at previous time, wherein the registration calculation comprises the following steps of respectively extracting characteristic points of the look-around view at previous time and characteristic points of the look-around view at current time by using an ORB algorithm; using the steering wheel angle information and the vehicle speed information to calculate a position of a characteristic point of the look-around view at previous time in the look-around view at current time according to a vehicle motion model, and selecting a characteristic point located near the position from the characteristic points of the look-around view at current time to be matched with the characteristic point of the look-around view at previous time; calculating an affine transformation matrix between the look-around view at previous time and the look-around view at current time;
  performing affine transformation on the look-around view at previous time by using the affine transformation matrix and performing weighted fusion with the look-around view at current time to generate an updated look-around view and save the updated look-around view;
  repeating the above steps to obtain continuously updated panoramic look-around views.

According to the panoramic look-around view generation method described above, the ORB algorithm is used to respectively extract the characteristic points of the look-around view at previous time and the look-around view at current time, and then the steering wheel angle information and the vehicle speed information are used to calculate a position of a characteristic point of the look-around view at previous time in the look-around view at current time according to a vehicle motion model, so that a characteristic point located near the position is selected from the characteristic points of the look-around view at current time to be matched with the characteristic point of the look-around view at previous time. In this way, the calculation amount of characteristic point matching can be effectively reduced, and the accuracy of characteristic point matching is improved. After that, the affine transformation matrix between the look-around view at previous time and the look-around view at current time is calculated, and the affine transformation matrix is used to realize a panoramic look-around view, so that the display blind area of the underbody region in the look-around view can be eliminated. Therefore, the driver and passenger can know the road condition of the underbody region in real time, accurately analyze and judge the position and condition of the vehicle during driving, thereby improving the driving safety.

In one embodiment, the registration calculation further comprises: using the steering wheel angle information and the vehicle speed information to obtain a first transformation matrix of image coordinate systems from the previous time to the current time according to the vehicle motion model.

In one embodiment, the calculating the position of the characteristic point of the look-around view at previous time in the look-around view at current time according to the vehicle motion model by using the steering wheel angle information and the vehicle speed information comprises determining a position of a characteristic point of the look-around view at previous time in the look-around view at current time by using the first transformation matrix.

In one embodiment, the calculating the affine transformation matrix between the look-around view at previous time and the look-around view at current time comprises:
  calculating a second transformation matrix by using a RANSAC algorithm according to the extracted characteristic points of the look-around view at previous time and the characteristic points of the look-around view at current time;

calculating the similarity between the second transformation matrix and the first transformation matrix, using the first transformation matrix as the affine transformation matrix when the similarity is less than a preset threshold, and using the second transformation matrix as the affine transformation matrix when the similarity is greater than or equal to the preset threshold.

In one embodiment, the first transformation matrix is:

$$\begin{bmatrix} u_1 \\ v_1 \\ 1 \end{bmatrix} = \begin{bmatrix} \cos\theta & \sin\theta & P_x - P_x\cos\theta - P_y\sin\theta \\ -\sin\theta & \cos\theta & P_y - P_y\cos\theta + P_x\sin\theta \\ 0 & 0 & 1 \end{bmatrix} \begin{bmatrix} u_0 \\ v_0 \\ 1 \end{bmatrix}$$

wherein $(P_x, P_y)$ the coordinate of the rotation center for the vehicle motion; $\theta$ is the rotation angle of the vehicle from the previous time to the current time; $(u_0, v_0)$ is a coordinate of a characteristic point of the look-around view at previous time the in the look-around view at previous time; $(u_1, v_1)$ is the coordinate of the characteristic point of the look-around view at previous time in the look-around view at current time.

In one embodiment, the extracting the characteristic point of the look-around view at previous time and the characteristic point of the look-around view at current time using an ORB algorithm respectively comprises:

creating an improved quadtree to represent the actually extracted characteristic points, wherein each node of the quadtree has a physical space occupied by itself and key points contained in the node;

According to the physical space, equally dividing the key point from one to four, wherein the original key points are divided into sub-nodes where they are located at the same time, and the dividing of the quadtree will not stop until the number of nodes of the quadtree is greater than or equal to the number of target key points or the number of nodes of the quadtree does not change any more;

when the number of key points in the node of the quadtree is greater than 1, the characteristic point with the highest score is selected as the extracted Characteristic point.

In one embodiment, before the images acquired from the plurality of cameras are transformed and mosaiced to obtain a look-around view at current time and the look-around view at current time is saved, distortion correction and perspective transformation are performed on the images acquired from the plurality of cameras according to the calibrated internal parameter and external parameter information of the plurality of cameras.

An in-vehicle device mounted on a vehicle includes:

a data acquisition unit which is configured to acquire images of areas around the vehicle from a plurality of cameras installed on the vehicle, and acquire steering wheel angle information and vehicle speed information from the vehicle;

an image transformation unit which is configured to transform and mosaic images acquired from the plurality of cameras to generate a look-around view associated with time, and use the look-around view generated at current time as the look-around view at current time;

an image storage unit, which is configured to store the look-around view at current time and the look-around view at previous time;

an image processing unit which is configured to perform registration calculation on the look-around view at current time and the look-around view at previous time, wherein the registration calculation comprises extracting characteristic points of the look-around view at previous time and the look-around view at current time respectively by using an ORB algorithm; using the steering wheel angle information and the vehicle speed information to calculate a position of a characteristic point of the look-around view at previous time in the look-around view at current time according to a vehicle motion model, and selecting a characteristic point located near the position from the characteristic points of the look-around view at current time to be matched with the characteristic point of the look-around view at previous time; calculating an affine transformation matrix between the look-around view at previous time and the look-around view at current time; performing affine transformation on the look-around view at previous time by using the Milne transformation matrix and performing weighted fusion with the look-around view at current time to generate an updated look-around view and save the updated look-around view; according to continuous time, generating continuously updated panoramic look-around views.

In the in-vehicle device, the image processing unit is further configured to obtain a first transformation matrix of image coordinate systems from the previous time to the current time according to the vehicle motion model by using the steering wheel angle information and the vehicle speed information; the image processing unit is further configured to determine a position of a characteristic point of the look-around view at previous time in the look-around view at current time using the first transformation matrix, so that a characteristic point located near the position is selected in the look-around view at current time to be matched with the characteristic point of the look-around view at previous time. The calculation amount of characteristic point matching can be effectively reduced, and the accuracy of characteristic point matching is improved. After that, the affine transformation matrix between the look-around view at previous time and the look-around view at current: time is calculated, and the affine transformation matrix is used to realize a panoramic look-around view, so that the display blind area of the underbody region in the top view of the vehicle body can be eliminated, the driver and passenger can know the road condition of the underbody region in real time, accurately analyze and judge the position and condition of the vehicle during driving, thereby improving the driving safety.

In one embodiment, the image processing unit is further configured to use the steering wheel angle information and the vehicle speed information to obtain a first transformation matrix of the image coordinate systems from the previous time to the current tune according to the vehicle motion model.

In one of the embodiments, the image processing unit is further configured to determine a position of a characteristic point of the look-around view at previous time in the look-around view at current time using the first transformation matrix.

In one embodiment, the image processing unit is further configured to calculate a second transformation matrix using a RANSAC algorithm according to the extracted characteristic points of the look-around view at previous time and the characteristic points of the look-around view at current time; calculate the similarity between the second transformation matrix and the first transformation matrix, use the first transformation matrix as the affine transformation matrix when the similarity is less than a preset threshold, and use the second transformation matrix as the affine transformation matrix when the similarity is greater than or equal to the preset threshold.

In one embodiment, the image processing unit is further configured to create an improved quadtree to represent the actually extracted characteristic points, and each node of the quadtree has a physical space occupied by itself and characteristic points contained in the node. According to the physical space, the characteristic point is equally divided from one to four. The original characteristic points are divided into sub-nodes where they are located at the same time. The dividing of the quadtree will not stop until the number of nodes of the quadtree is greater than or equal to the number of target key points or the number of nodes of the quadtree does not change any more. When the number of key points in the node of the quadtree is greater than 1, the characteristic point with the highest score is selected as the extracted characteristic point.

An in-vehicle system mounted on a vehicle includes a plurality of cameras mounted on the vehicle, the above-described in-vehicle device, and a display unit for displaying a panoramic look-around view generated by the in-vehicle device.

In the in-vehicle system, the cameras capture the image information, and then the in-vehicle device acquires the image and vehicle motion information, processes and transforms the image and the vehicle motion information to generate a panoramic look-around view. Then the panoramic look-around view is displayed through a display unit, so that the panoramic look-around view including the underbody region can be displayed in time, the road condition of the vehicle underbody region can be known in real time by drivers and passengers conveniently. The position and the condition of the vehicle during driving can be accurately analyzed and judged, and the driving safety is improved.

DESCRIPTION OF THE DRAWINGS

FIGS. 3A-3E are schematic views showing the effects of a panoramic look-around view generation method according to an embodiment of the present application;

FIGS. 4A and 4B are comparative schematic views of a look-around view at previous time and a look-around view at current time of a panoramic look-around view generation method according to an embodiment of the present application;

FIG. 5 is a sub-flowchart of a panoramic look-around view generation method according to an embodiment of the present application;

FIGS. 9A-9C are schematic views of an improved ORB algorithm according to the embodiment shown in FIG. 8;

DETAILED DESCRIPTION OF THE INVENTION

Figure 1:
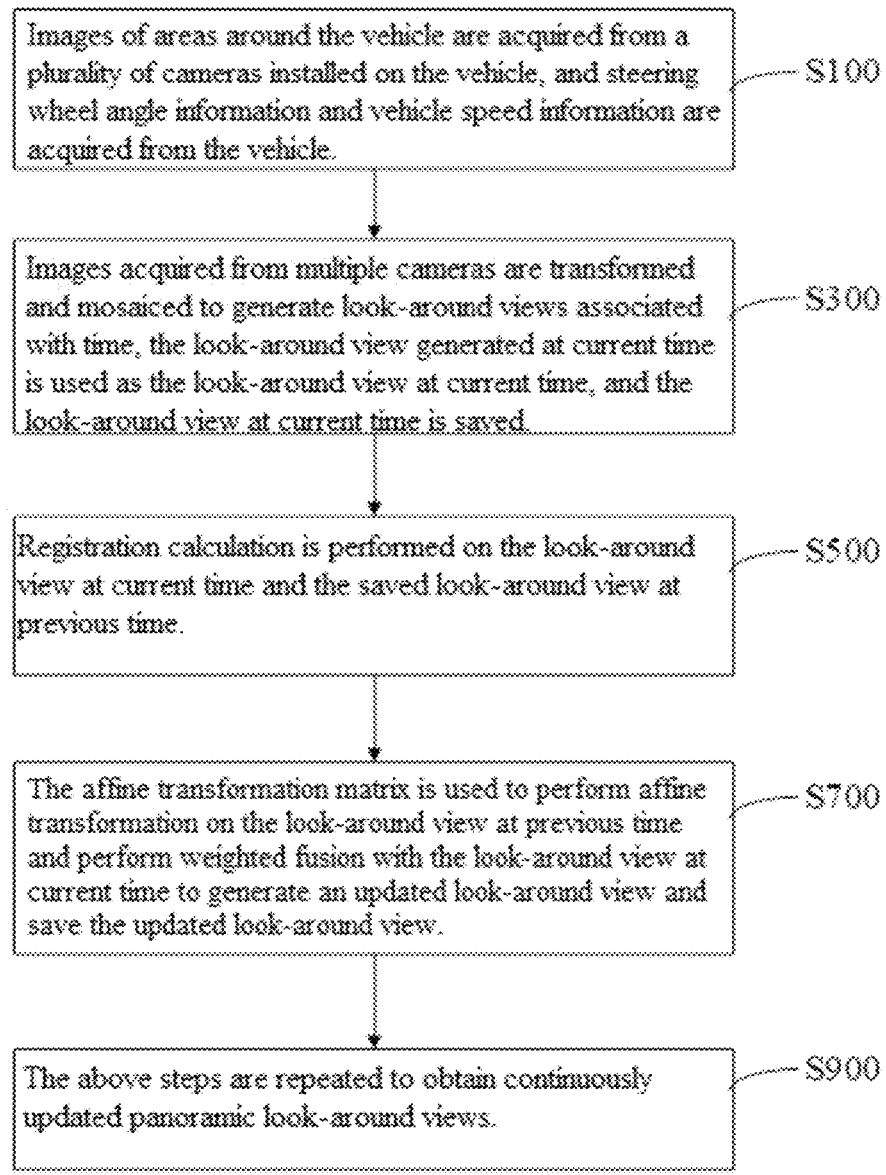
FIG. 1 is a flowchart of a panoramic look-around view generation method according to an embodiment of the present application.
Figure 2:
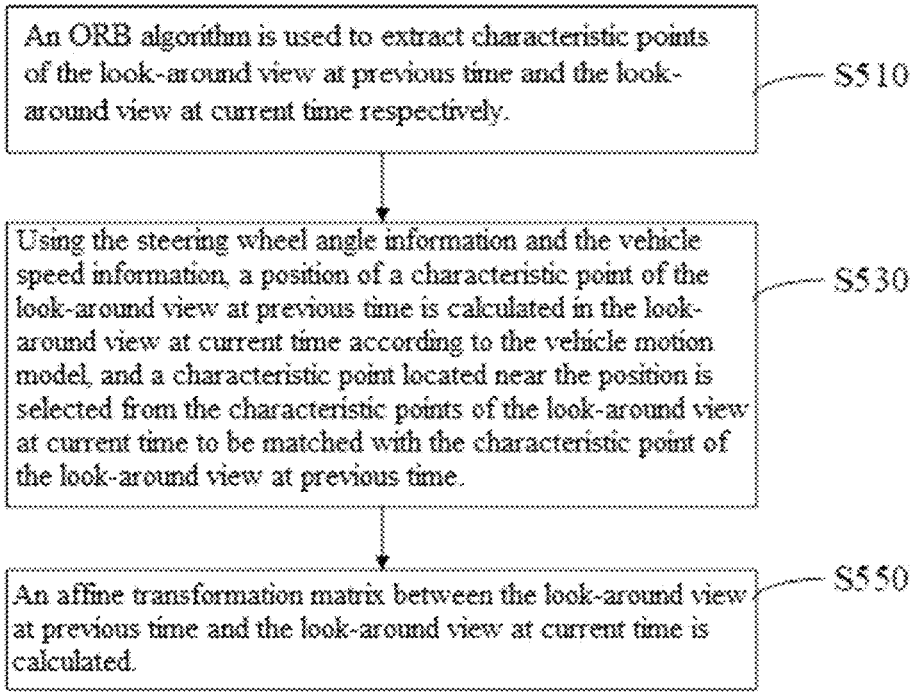
FIG. 2 is a sub-flowchart of registration calculation of the panoramic look-around view generation method according to the embodiment shown in FIG. 1.

Please refer to FIGS. 1 to 4, FIG. 1 is a flowchart of a panoramic look-around view generation method according to an embodiment of the present application. FIG. 2 is a sub-flowchart of registration calculation of the panoramic look-around view generation method according to the embodiment of FIG. 1. FIG. 3 is a schematic view showing effects of a panoramic look-around view generation method according to an embodiment of the present application. FIGS. 4A and 4B are comparative schematic views of a look-around view at previous time and a look-around view at current time of the panoramic look-around view generation method according to an embodiment of the present application.

As shown in FIG. 1, the panoramic look-around view generation method includes the following steps.

S100: images of areas around the vehicle are acquired from a plurality of cameras installed on the vehicle, and steering wheel angle information and vehicle speed information are acquired from the vehicle. During the movement of the vehicle, the cameras, such as fisheye cameras, arranged at the front and rear of the vehicle, and at the left rearview mirror and right rearview mirror of the vehicle can acquire images of areas around the vehicle in real time, and the steering wheel angle information and vehicle speed information can be acquired through the vehicle control system in the vehicle. It is also possible to acquire relevant data through a server connected via an in-vehicle network. For example, the server has a look-around view library that stores data from the look-around cameras, and a vehicle information database that stores the steering wheel angle information, the vehicle speed information, and similar information.

S300: images acquired from multiple cameras are transformed and mosaiced to generate look-around views associated with time, the look-around view generated at current time is used as the look-around view at current time, and the look-around view at current time is saved. The obtained look-around view contains time information, and the look-around view at current time and the look-around view at previous time can be determined according to the time information contained therein. At this time, since the camera cannot capture the underbody region, the underbody region in the obtained look-around view is a black area (see FIG. 3). As a result, drivers and passengers cannot know the condition of the underbody region, thus becoming a blind area for driving and having certain hidden dangers.

S500: registration calculation is performed on the look-around view at current time and the saved look-around view at previous time. Referring to FIG. 3A and FIG. 3B, FIG. 3A is a saved view of the look-around view at previous time, FIG. 3B is a view of the look-around view at current time, shaded parts in the figures are under body areas, and A, B and C are respectively selected reference points. In the look-around view at previous time, the points A and B are both visible. As the vehicle travels, the point A in the look-around view at current time is blocked by the vehicle body and enters the blind area of the underbody region.

If it is an initial time and there is no look-around view at previous time, the saved look-around view at current time is saved as an initial image.

Referring to FIG. 2, the registration calculation S500 includes:

S510: an ORB algorithm is used to extract characteristic points of the look-around view at previous time and the look-around view at current time respectively. In general, the number of characteristic points is not less than three. The ORB (Oriented FAST and Rotated BRIEF) algorithm is an algorithm based on FAST corner detection algorithm and BRIEF descriptor. Using the ORB algorithm to extract characteristic points requires less computation amount and is more efficient.

S530: using the steering wheel angle information and the vehicle speed information, a position of a characteristic point of the look-around view at previous time is calculated in the look-around view at current time according to the vehicle motion model, and a characteristic point located near the position is selected from the characteristic points of the look-around view at current time to be matched with the characteristic point of the look-around view at previous time. Referring to FIGS. 4A and 4B, FIG. 4A is a look-around view at previous time and FIG. 4B is a look-around view at current time. The ORB algorithm is used to calculate characteristic point sets $\{a_1, a_2, \ldots, a_m\}$ and $\{b_1, b_2, \ldots, b_n\}$ for FIGS. 4A and 4B respectively. The coordinate of the characteristic point $a_i$ in FIG. 4A is $(u_i, v_i)$ whose position in image B can be calculated as $(u'_i, v'_i)$ using the obtained steering wheel angle information and vehicle speed information. The) characteristic points near the $(u'_i, v'_i)$ vs can be selected as the best possible matched characteristic point to $a_i$. Therefore, a characteristic point near the $(u'_i, v'_i)$ can be selected from $\{b_1, b_2, \ldots, b_n\}$ to be matched. In this way, the matching degree between each characteristic point $a_i$ in $\{a_1, a_2, \ldots, a_m\}$ and each characteristic point in the set $\{b_1, b_2, \ldots, b_n\}$ is calculated respectively. Therefore, the calculation amount can be reduced, mismatching can be reduced, thereby improving the matching accuracy. When the amount of data is relatively large, it can be matched by FLANN (Fast Library for Approximate Nearest Neighbor). When the amount of data is relatively small, it can use violent matching algorithm. Of course, it can also use other algorithms for matching.

S550: an affine transformation matrix between the look-around view at previous time and the look-around view at current time is calculated.

S700: the affine transformation matrix is used to perform affine transformation on the look-around view at previous time and perform weighted lesion with the look-around view at current time to generate an updated look-around view and save the updated look-around view. As shown in FIGS. 3A to 3C, an updated look-around view at current time (FIG. 3C) can be obtained by performing affine transformation on the look-around view at previous time (FIG. 3A) using the affine transformation matrix, and performing weighted fusion with the look-around view at current time (FIG. 3B). In FIG. 3C, even if it is blocked by the vehicle body (shown by shading), the blocked part can be visible based on the affine transformation of the look-around view at previous time and weighted fusion with the look-around view at current time. For example, a point A is visible in FIG. 3C at this time. Therefore, the blind area of the underbody region is eliminated, and the visualization of the underbody region is realized.

S900: the above steps S100 to S700 are repeated to obtain continuously updated panoramic look-around views. Referring to FIGS. 3C to 3E, the vehicle continues to drive to obtain the look-around view at current time (FIG. 3D). A point B starts to be blocked by the vehicle body. At this time, FIG. 3C is the look-around view at previous time. At this time, a point C is selected for alignment to calculate the position of the point B in the look-around view at current time. Then, the look-around view at previous time (FIG. 3C) is affine transformed by using the affine transformation matrix and is weighted fused with the look-around view at current time (FIG. 3D) to obtain the updated look-around view at current time (FIG. 3E). In FIG. 3E, the points A and B of the underbody part covered by the vehicle body are both visible. Therefore, by repeating the above steps, continuously updated panoramic views can be obtained, and continuous visualization of the under body region can be realized during driving.

According to the panoramic look-around view generation method, an ORB algorithm is used to respectively extract the characteristic points of the look-around view at previous time and the characteristic points of the look-around view at current time, and then a position of a characteristic point of the look-around view at previous time is calculated in the look-around view at current time according to a vehicle motion model by using steering wheel angle information and vehicle speed information, so that a characteristic point located near the position are selected in the look-around view at current time to be matched with the characteristic point of the look-around view at previous time. The matching calculation amount can be effectively reduced, and the matching accuracy is improved. After that, the affine transformation matrix between the look-around view at previous time and the look-around view at current time is calculated, and the a affine transformation matrix is used to realize a panoramic look-around view, so that the display blind area of the underbody region in the top view of the vehicle body can be eliminated, the driver and passenger can know the road condition of the underbody region in real time, accurately analyze and judge the position and condition of the vehicle during driving, thereby improving the driving safety.

Please refer to FIG. 5, which is a sub-flowchart according to an embodiment of the present application. In S500, the registration calculation between the look-around view at current time and the saved look-around view at previous time further includes the step S541 of using steering wheel angle information and vehicle speed information to obtain a first transformation matrix of the image coordinate systems from the previous time to the current time according to the vehicle motion model. As shown by the dashed line in FIG. 3B, although the point A is not visible in the look-around view at current time, the point B can be aligned by using the first transformation matrix, and then the position of the point A can be calculated in the look-around view at current time according to the position of point A in the look-around view at previous time. Even if the point A cannot be displayed in the look-around view at current time due to blocking by the vehicle body, its position can be determined. In this way, the corresponding relationship between the look-around view at previous time and the look-around view at current time can be obtained through the first transformation matrix, and a position of a point in the look-around view at previous tune can be conveniently calculated in the look-around view at current time.

In one embodiment, in S530, using the steering wheel angle information and vehicle speed information to calculate the position of the characteristic point of the look-around view at previous time in the look-around view at current time according to the vehicle motion model includes determining the position of the characteristic point of the look-around view at previous time in the look-around view at current time using the first transformation matrix. By using the first transformation matrix as the guidance information, the matching efficiency of characteristic points can be improved and the calculation speed can be increased.

Figure 6:
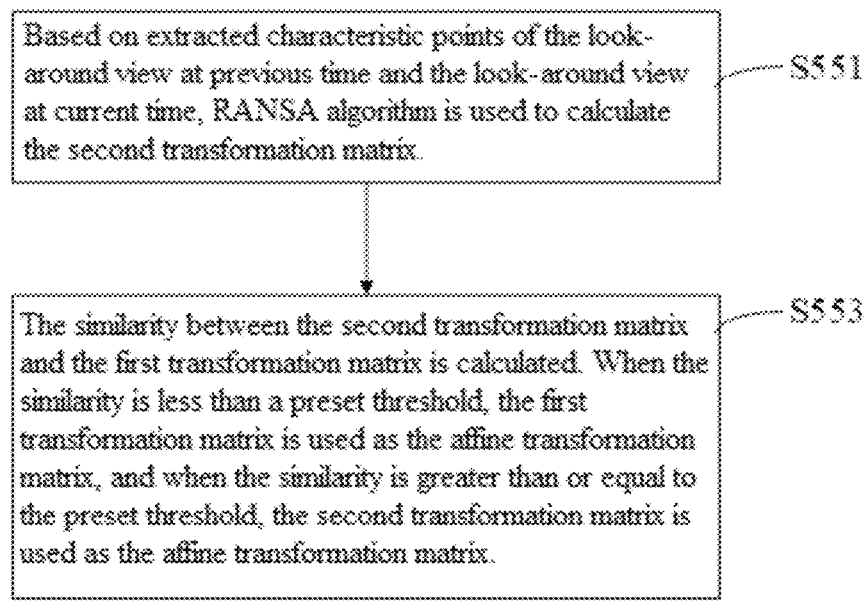
FIG. 6 is a sub-flowchart of a panoramic look-around view generation method according to an embodiment of the present application.

Referring to FIG. 6, this is a sub-flowchart of an embodiment of the present application, in this embodiment, calculating the affine transformation matrix between the look-around view at previous time and the look-around view at current time S550 further comprises:

S551: according to the extracted characteristic points of the look-around view at previous time and the characteristic points of the look-around view at current time, a RANSAC algorithm is used to calculate a second transformation matrix. The RANSAC (Random Sample Consensus) algorithm is a random sampling consistency algorithm, which is a method to calculate the parameters of mathematical model by using a set of sample data sets containing abnormal data. The noise of the second transformation matrix obtained by this algorithm has less influence on the solution result.

S553: the similarity between the second transformation matrix and the first transformation matrix is calculated. When the similarity is less than a preset threshold, the first transformation matrix is used as the Milne transformation matrix, and when the similarity is greater than or equal to the preset threshold, the second transformation matrix is used as the affine transformation matrix. In this embodiment, the first transformation matrix and the second transformation matrix can be respectively split into a rotation component matrix and a translation component matrix, and then the rotation component matrix and the translation component matrix can be respectively compared. For example, the rotation component matrix and the translation component matrix can be respectively expanded into vectors, and the product between vectors corresponding to the first transformation matrix and the second transformation matrix is calculated and divided by the module length to obtain the rotation component similarity D1 and the translation component similarity D2. At this time, the similarity D of the first transformation matrix and the second transformation matrix can be obtained by the following formula:

$$D = |a \times D1 + b \times D2|$$

Wherein a and b are preset coefficients. The higher the similarity between the first transformation matrix and the second transformation matrix, the greater the similarity D, and the lower the similarity between the first transformation matrix and the second transformation matrix, the smaller the similarity D. Comparing the similarity with a preset threshold, if the similarity is less than the preset threshold, that is, the similarity between the first transformation matrix and the second transformation matrix is lower, then the calculation reliability of the second transformation matrix is considered to be lower, and then the first transformation matrix will be used as the affine transformation matrix. If the similarity is greater than or equal to the preset threshold, that is, the similarity between the first transformation matrix and the second transformation matrix is higher, the reliability of the second transformation matrix is higher, and then the second transformation matrix is used as the affine transformation matrix. The selection of the preset threshold can be obtained according to experimental tests or determined according to the acceptable or tolerable difference range. Due to some objective factors in the actual data acquisition, such as motion model error, data acquisition error, vehicle slip, etc., there may be errors in the calculation of the first transformation matrix, while the second transformation matrix is calculated through a series of algorithms by extracting eigenvalues and matching, which is generally more reliable, but there is also the risk of calculation errors. Therefore, this embodiment of the present application determines the affine transformation matrix by comparing the similarity between the first transformation matrix and the second transformation matrix, which can eliminate obvious erroneous results and improve the accuracy and reliability of calculation.

Figure 7:
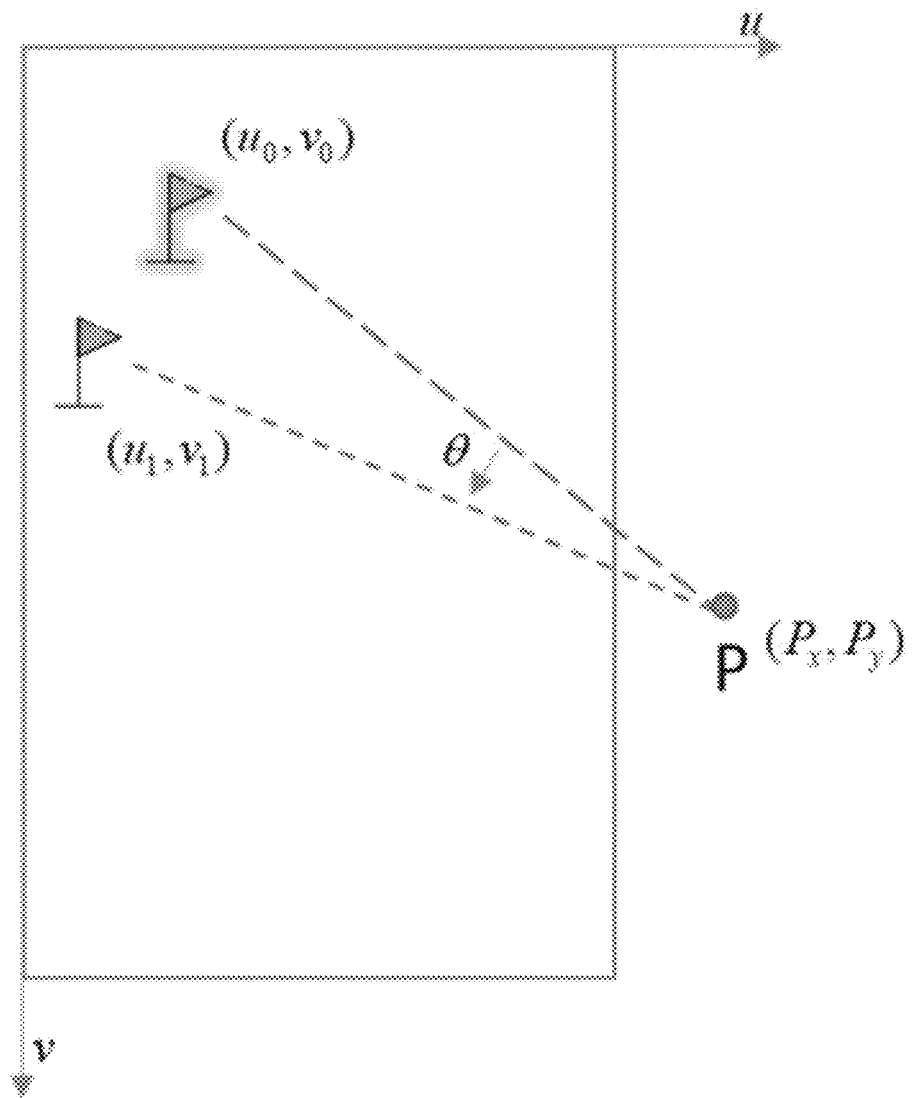
FIG. 7 is a schematic view of coordinates of a vehicle motion model of a panoramic look-around view generation method according to an embodiment of the present application.

In one of the embodiments, the vehicle motion model may be a bicycle model-based vehicle motion model, which ignores the motion of the vehicle in the vertical direction, and assumes that the two front wheels of the vehicle have the same angle and rotational speed, so do the two rear wheels, so that the motion of the vehicle can be described in a two-dimensional plane, as shown in FIG. 7. In the two-dimensional coordinate system OXY, $(X_r, Y_r)$ and $(X_f, Y_f)$ are the axle center coordinates of the rear axle and the front axle of the vehicle, respectively; $\varphi$ is the heading angle of the vehicle, counterclockwise is positive; $\delta_j$ is the front wheel's deflection angle $v_r$ is the speed of the rear axle center of the vehicle; $v_f$ is the speed of the front axle center of the vehicle and L is the wheelbase length. Then the vehicle motion model at this moment is:

$$\begin{bmatrix} \dot{X}_r \\ \dot{Y}_r \\ \dot{\varphi} \end{bmatrix} = \begin{bmatrix} \cos \varphi \\ \sin \varphi \\ \tan \delta_f / L \end{bmatrix} v_r$$

Referring to FIG. 4A and FIG. 4B, at a certain moment, the vehicle rotates around the center P which can be obtained by calculating the radius R, and the angular velocity of rotation is w. Relatively, the objects around the vehicle are moving in reverse direction, that is to say, moving at angular velocity −w around the center P. At time $t_0$, a look-around view 4A is obtained, at which time the vehicle's traveling speed is $v_0$ and the yaw angle is $\delta_0$; at time $t_1$, a look-around view 4B is obtained, and the transformation matrix between the look-around view 4A and the look-around view 4B can be calculated according to the above-mentioned vehicle motion model, that is, the first transformation matrix is:

$$\begin{bmatrix} u_1 \\ v_1 \\ 1 \end{bmatrix} = \begin{bmatrix} \cos\theta & \sin\theta & P_x - P_x\cos\theta - P_y\sin\theta \\ -\sin\theta & \cos\theta & P_y - P_y\cos\theta + P_x\sin\theta \\ 0 & 0 & 1 \end{bmatrix} \begin{bmatrix} u_0 \\ v_0 \\ 1 \end{bmatrix}$$

Wherein $(P_x, P_y)$ Is the coordinate of the rotation center of the vehicle motion; $\theta$ is the rotation angle of the vehicle from the previous time to the current time; $(u_0, v_0)$ is a coordinate of a characteristic point of the look-around view at previous time in the look-around view at previous time, and $(u_1, v_1)$ is the coordinate of the characteristic point of the look-around view at previous time in the look-around view at current time. Using the first transformation matrix, the look-around view 4A can be transformed to the look-around view 4B and aligned.

Figure 8:
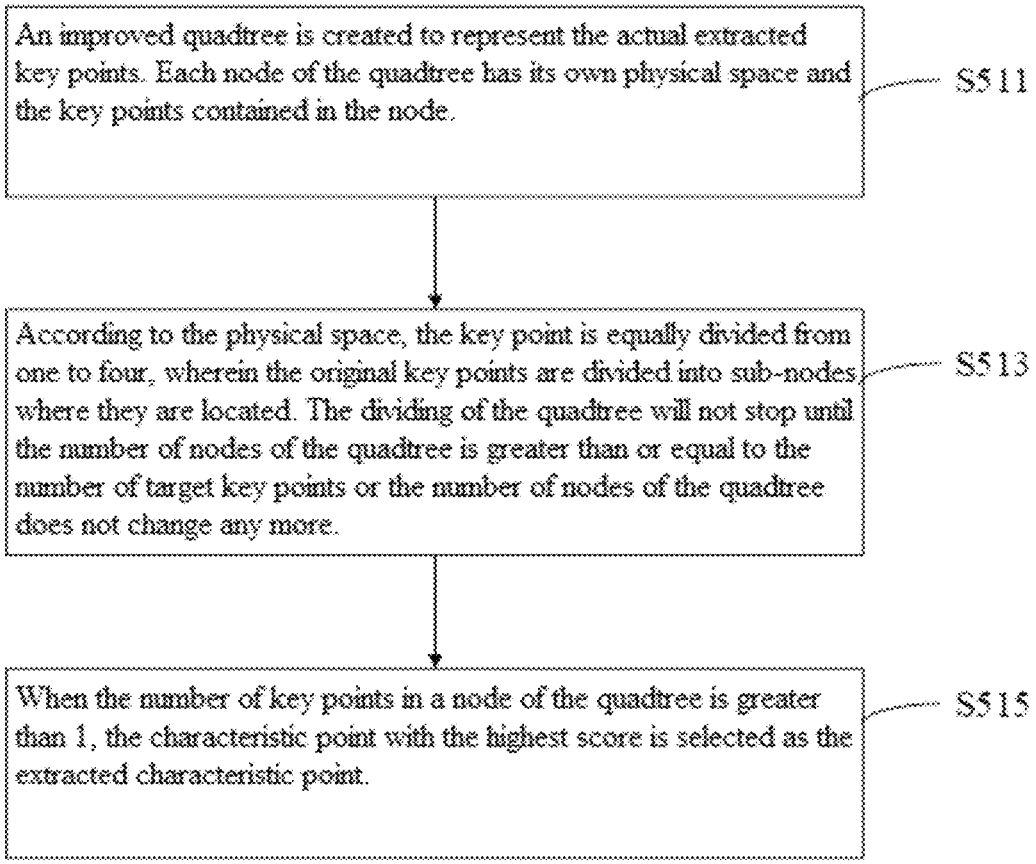
FIG. 8 is a sub-flowchart of a panoramic look-around view generation method according to an embodiment of the present application.

Referring to FIG. 8, this is a sub-flowchart of an embodiment of the present application, Please refer to FIGS. 9A to 9C. In this embodiment, in step S510, the ORB algorithm is used to extract characteristic points of the look-around view at previous time and the characteristic points of the look-around view at current time, respectively. The step further comprises:

S511: an improved quadtree is created to represent the actual extracted key points. Each node of the quadtree has its own physical space and the key points contained in the node. As shown in FIG. 9A, dots represent key points.

S513: according to the physical space, the key point is equally divided from one to four, wherein the original key points are divided into sub-nodes where they are located. The dividing of the quadtree will not stop until the number of nodes in the quadtree is greater than or equal to the number of target key points, or the number of the nodes in the quadtree does not change. In this embodiment, as shown in FIG. 9A, there are 10 original key points, and the number of target key points is assumed to be 6. Since the target key points are less than the original key points, the original space is equally divided from one to four to generate four space nodes, as shown in FIG. 9B. At this time, the number of characteristic points in the space node II and the space node III is only 1, so the space node II and the space node III will not be further divided. Since the number of characteristic points in the space node I and the space node IV are both greater than 1, which are 6 and 2 respectively, the space node I. and the space node IV are equally divided from one to four for the second time, as shown in FIG. 9C. At this time, if the number of space nodes containing key points is 8, which is greater than the number 6 of target key points, the dividing stops.

S515: When the number of key points in a node of the quadtree is greater than 1, the characteristic point with the highest score is selected as the extracted characteristic point. In embodiment, the current nodes are sorted in descending order according to the number of included characteristic points, and the first 6 nodes are selected as the space nodes where the target characteristic points are located. For space nodes with more than one characteristic point, the optimal characteristic point is selected as the representative key point of the node according to the scores of these characteristic points. The score of this characteristic point is also the score of "significance" of the characteristic point, which is related to the extraction method of the characteristic point. For example, FAST characteristic point is used in the ORB algorithm, and its score is the sum of absolute values of differences between a gray value of a certain pixel point and gray values of 16 pixel points around it. The larger this value, the more "significant" the characteristic point is.

Figure 10A:
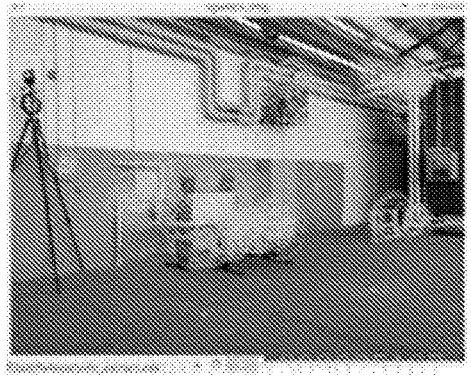
FIGS. 10A and 10B are schematic views comparing the effects of the improved ORB algorithm shown in FIGS. 9A-9C.
Figure 10B:
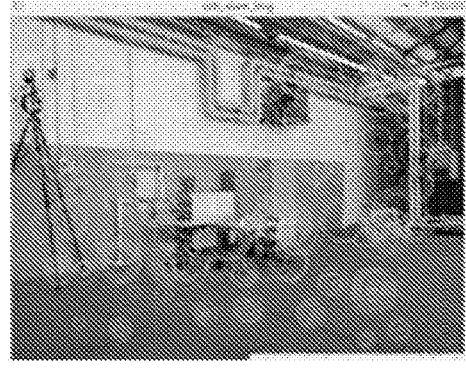

Referring to FIG. 10A and FIG. 10B, due to the changeable scenes in actual work, it is often encountered that the characteristic points are relatively concentrated at some part and the rest is relatively flat. In this case, the characteristic points detected by the conventional ORB algorithm are also relatively concentrated, as shown by circles in FIG. 10A. However, by using the improved ORB algorithm of this embodiment, the detected characteristic points can be distributed more uniformly, as shown in FIG. 10B thus facilitating subsequent characteristic point matching and calculation, improving matching accuracy and calculation efficiency.

Figures 11, 12:
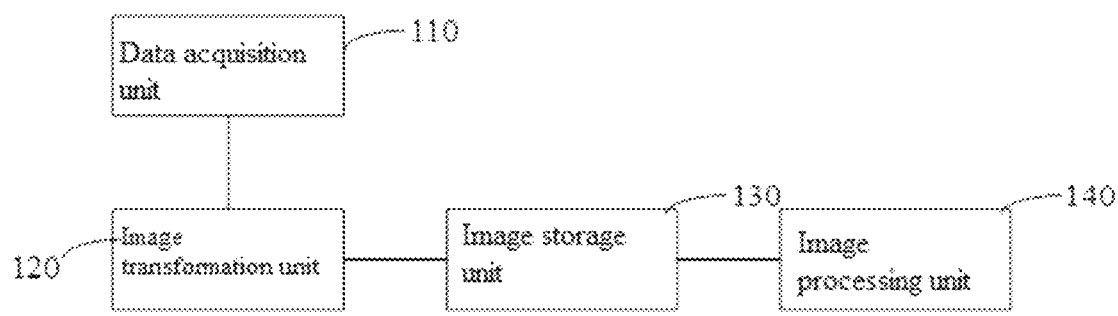
FIG. 11 is a sub-flowchart of a panoramic look-around view generation method according to an embodiment of the present application.
FIG. 12 is a structure diagram of an in-vehicle deice according to an embodiment of the present application.

In one embodiment, referring to FIG. 11, in S300, before the images acquired from the plurality of cameras are transformed and mosaiced to obtain the look-around view at current time, and the look-around view at current time is saved, distortion correction and perspective transformation are performed on the images acquired from the plurality of cameras according to the calibrated internal parameter and external parameter information of the plurality of cameras. In this way, the acquired camera data can be transformed to improve the accuracy and effectiveness of subsequent image mosaic transformation.

Please refer to FIG. 12, which is a structure diagram of an in-vehicle device according to an embodiment of the present invention. As shown in the figure, the in-vehicle device 100 includes a data acquisition unit 110, an image transformation unit 120, an image storage unit 130, and an image processing unit 140. The data acquisition unit 110 is configured to acquire images of areas around the vehicle from a plurality of cameras installed on the vehicle, and to acquire steering wheel angle information and vehicle speed information from the vehicle. The image transformation unit 120 is configured to generate a look-around view associated with time by transforming and mosaicking the images acquired from a plurality of cameras, and use the look-around view generated at current time as the look-around view at current time. The image storage unit 130 is configured to store the look-around view at current time and the look-around view at previous time. The image processing unit 140 is configured to perform registration calculation on the look-around view at current time and the look-around view at previous time, wherein the registration calculation includes: extracting characteristic points of the look-around view at previous time and characteristic points of the look-around view at current time respectively using an ORB algorithm: using steering wheel angle information and vehicle speed information to calculate a position of a characteristic point of the look-around view at previous time in the look-around view at current time according to the vehicle motion model, and selecting a characteristic point located near the position from the characteristic points of the look-around view at current time to be matched with the characteristic point of the look-around view at previous time; calculating an affine transformation matrix between the look-around view at previous time and the look-around view at current time; performing affine transformation on the look-around view at previous time using the affine transformation matrix, and performing weighted fusion with the look-around view at current time to generate an updated look-around view, and saving the updated look-around view; according to continuous moments, generating continuously updated panoramic look-around views.

In the in-vehicle device, camera images and vehicle motion information are acquired through a data acquisition unit, and a position of a characteristic point of the look-around view at previous time in the look-around view at current time can be calculated by the image processing unit using the acquired steering, wheel angle information and vehicle speed information according, to a vehicle motion model, so that a characteristic point located near the position is selected in the look-around view at current time to be matched with the characteristic point of the look-around view at previous time. Therefore, the calculation amount of characteristic point matching can be effectively reduced, and the matching accuracy is improved. After that, the affine transformation matrix between the look-around view at previous time and the look-around view at current time is calculated, and the affine transformation matrix is used to realize a panoramic look-around view, so that the display blind area of the underbody region in the top view of the vehicle body can be eliminated. Therefore, the driver and passenger can know the road condition of the underbody region in real time, accurately analyze and judge the position and condition of the vehicle during driving, thereby improving the driving safety.

In one embodiment, the image processing unit 140 is further configured to use the steering wheel angle information and the vehicle speed information to obtain a first transformation matrix of image coordinate systems from the previous time to the current time according to the vehicle motion model. Therefore, the corresponding relationship between the look-around view at previous time and the look-around view at current time can be obtained through the first transformation matrix, and a position of a point of the look-around view at previous time in the look-around view at current time can be conveniently calculated.

In one embodiment, the image processing unit 140 is further configured to use the first transformation matrix to determine the position of the characteristic point of the look-around view at previous time in the look-around view at current time. This can further optimize the matching efficiency and accuracy.

In one embodiment, the image processing unit 140 is further configured to calculate a second transformation matrix using a RANSAC algorithm according to the extracted characteristic points of the look-around view at previous time and the characteristic points of the look-around view at current time, calculate the similarity between the second transformation matrix and the first transformation matrix, use the first transformation matrix as an affine transformation matrix when the similarity is less than a preset threshold, and use the second transformation matrix as an affine transformation matrix when the similarity is greater than or equal to the preset threshold. Thus, the image processing, unit of this embodiment determines the affine transformation matrix by comparing the similarity between the first transformation matrix and the second transformation matrix, thus improving the accuracy of calculation.

In one embodiment, the image processing unit 140 is further configured to create an improved quadtree to represent the actually extracted characteristic points, and each node of the quadtree has its own physical space and the characteristic points contained in the node. According to the physical space, the characteristic points are equally divided from one to four. The original characteristic points are divided into sub-nodes where they are located at the same time. The dividing will not stop until the number of nodes in the quadtree is greater than or equal to the number of target key points or the number of nodes in the quadtree does not change any more. When the number of key points in a quadtree node is greater than 1, the characteristic point with the highest score is selected as the extracted characteristic point. Using the improved ORB algorithm, the image processing unit can make the distribution of detected characteristic points more uniform, which is conducive to subsequent characteristic point matching and calculation, and improves the matching accuracy and calculation efficiency.

Figure 13:
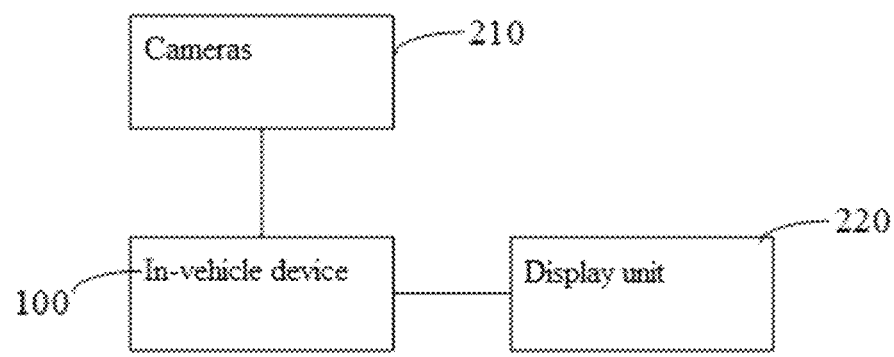
FIG. 13 is a structure diagram of an in-vehicle system according to an embodiment of the present application.

Please refer to FIG. 13, which is a structure diagram of an in-vehicle system according to an embodiment of the present invention. The in-vehicle system 200 is mounted on a vehicle, and includes a plurality of cameras 210 mounted on the vehicle, the in-vehicle device 100 as described above, and a display unit 220 for displaying a panoramic look-around view generated by the in-vehicle device 100 so as to be convenient for vehicle occupants to view in time.

Figure 14:
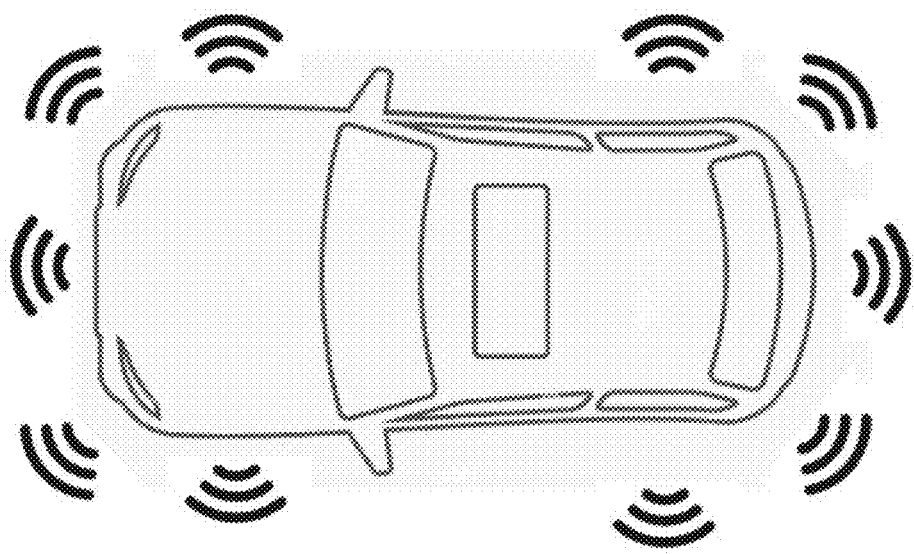
FIG. 14 is a silhouette diagram of a vehicle including cameras according to an embodiment of the present application.

FIG. 14 is a silhouette diagram of a vehicle including cameras according to an embodiment of the present invention. The cameras are mounted around the vehicle, and includes a plurality of cameras mounted on the front and back of the vehicle to allow the system to generate a panoramic look-around view.

The technical features of the above-mentioned embodiments can be combined in any way. In order to simplify the description, not all possible combinations of the technical features of the above-mentioned embodiments have been described. However, as long as there is no contradiction in the combination of these technical features, it should be considered as the scope recorded in this specification.

The above-mentioned examples only represent several embodiments of the present invention, and their descriptions are more specific and detailed, but they should not be construed as limiting the scope of the invention patent. It should be pointed out that for those skilled in the art, several modifications and improvements can be made without departing from the concept of the present invention, which are all within the scope of protection of the present invention. Therefore, the scope of protection of the patent of the present invention shall be subject to the appended claims.

What is claimed is:

1. A panoramic look-around view generation method, comprising steps of:
    acquiring images of areas around a vehicle from a plurality of cameras installed on the vehicle, and acquiring steering wheel angle information and vehicle speed information from the vehicle;
    generating a look-around view associated with a first time by transforming and mosaicking images acquired by the plurality of cameras, using the look-around view generated at a first time as the look-around view at the first time, and saving the look-around view at the first time;
    (i) acquiring images of areas around the vehicle from a plurality of cameras installed on the vehicle, and acquiring steering wheel angle information and vehicle speed information from the vehicle;
    (ii) generating the look-around view associated with a current time by transforming and mosaicking images acquired by the plurality of cameras, using the look-around view generated at the current time as the look-around view at the current time, and saving the look-around view at the current time;
    (iii) performing a registration calculation on the look-around view at the current time and a saved look-around view at a previous time, wherein the registration calculation comprises following steps of:
- (iv) respectively extracting a plurality of characteristic points of the look-around view at the previous time and a plurality of characteristic points of the look-around view at the current time by using an Oriented FAST and Rotated BRIEF (ORB) algorithm;
- (v) calculating a position of a characteristic point of the look-around view at the previous time in the look-around view at the current time according to a vehicle motion model using the steering wheel angle information and the vehicle speed information;

selecting a characteristic point located near the position from the characteristic points of the look-around view at the current time to be matched with the characteristic point of the look-around view at the previous time; and
- (vi) calculating an affine transformation matrix between the look-around view at the previous time and the look-around view at the current time;
- (vii) performing affine transformation on the look-around view at the previous time by using the affine transformation matrix and performing weighted fusion with the look-around view at the current time to generate an updated look-around view and save the updated look-around view;

repeating above steps (i)-(vii) to obtain continuously updated panoramic look-around views; and wherein a first transformation matrix of image coordinate systems is:

$$\begin{bmatrix} u_1 \\ v_1 \\ 1 \end{bmatrix} = \begin{bmatrix} \cos\theta & \sin\theta & P_x - P_x\cos\theta - P_y\sin\theta \\ -\sin\theta & \cos\theta & P_y - P_y\cos\theta + P_x\sin\theta \\ 0 & 0 & 1 \end{bmatrix} \begin{bmatrix} u_0 \\ v_0 \\ 1 \end{bmatrix}$$

wherein $(P_x, P_y)$ is the coordinate of a rotation center of the vehicle motion; $\theta$ is a rotation angle of the vehicle from the previous time to the current time; $(u_0, v_0)$ is a coordinate of a characteristic point of the look-around view at the previous time in the look-around view at the previous time; $(u_1, v_1)$ is the coordinate of the characteristic point of the look-around view at the previous time in the look-around view at the current time.

2. The panoramic look-around view generation method of claim 1, wherein the registration calculation further comprises using the steering wheel angle information and the vehicle speed information to obtain the first transformation matrix of image coordinate systems from the previous time to the current time according to the vehicle motion model; and wherein the step of calculating the position of the characteristic point of the look-around view at the previous time in the look-around view at the current time according to the vehicle motion model by using the steering wheel angle information and the vehicle speed information further comprises determining the position of the characteristic point of the look-around view at the previous time in the look-around view at the current time by using the first transformation matrix.

3. The panoramic look-around view generation method of claim 1, wherein the registration calculation further comprises using the steering wheel angle information and the vehicle speed information to obtain the first transformation matrix of image coordinate systems from the previous time to the current time according to the vehicle motion model; and wherein the step of calculating the affine transformation matrix between the look-around view at the previous time and the look-around view at the current time further comprises calculating a second transformation matrix by using a RANSAC algorithm according to the extracted characteristic points of the look-around view at the previous time and the characteristic points of the look-around view at the current time;

calculating the similarity between the second transformation matrix and the first transformation matrix, using the first transformation matrix as the affine transformation matrix when the similarity is less than a preset threshold, and using the second transformation matrix as the affine transformation matrix when the similarity is greater than or equal to the preset threshold.

4. The panoramic look-around view generation method of claim 1, wherein the extracting a plurality of characteristic points of the look-around view at the previous time and the characteristic points of the look-around view at the current time using the ORB algorithm respectively comprises:

creating an improved quadtree to represent the actually extracted characteristic points, wherein each node of the improved quadtree has a physical space occupied by itself and a key point contained in the node;

equally dividing the key point from one to four according to the physical space, wherein a number of original key points are divided into sub-nodes where they are located, and the dividing of the improved quadtree will not stop until the number of nodes of the improved quadtree is greater than or equal to a number of target key points or the number of nodes of the improved quadtree does not change any more;

selecting the characteristic point with the highest score as the extracted characteristic point when the number of key points in the node of the quadtree is greater than 1.

* * * * *